United States Patent
Tiernan et al.

(10) Patent No.: US 11,050,775 B2
(45) Date of Patent: *Jun. 29, 2021

(54) IOT AND POS ANTI-MALWARE STRATEGY

(71) Applicant: McAfee, LLC, Santa Clara, CA (US)

(72) Inventors: Sean T. Tiernan, Santa Clara, CA (US); Simon Hunt, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,589

(22) Filed: Sep. 30, 2019

(65) Prior Publication Data
US 2020/0106794 A1 Apr. 2, 2020

Related U.S. Application Data

(63) Continuation of application No. 16/116,452, filed on Aug. 29, 2018, now Pat. No. 10,432,655, which is a
(Continued)

(51) Int. Cl.
*H04L 29/06* (2006.01)
*G06F 21/52* (2013.01)
*H04L 12/24* (2006.01)

(52) U.S. Cl.
CPC .......... *H04L 63/1425* (2013.01); *G06F 21/52* (2013.01); *H04L 41/069* (2013.01); *H04L 41/0686* (2013.01)

(58) Field of Classification Search
CPC .............................. H04L 63/1425; G06F 21/52
See application file for complete search history.

(56) References Cited

U.S. PATENT DOCUMENTS

| 5,974,549 A | 10/1999 | Golan |
| 7,562,220 B2 | 7/2009 | Frank et al. |
(Continued)

FOREIGN PATENT DOCUMENTS

| AU | 2007202892 | 1/2009 |
| KR | 20070084259 | 8/2007 |

OTHER PUBLICATIONS

Yee, Bennet, et al. "Native client: A sandbox for portable, untrusted x86 native code." 2009 30th IEEE Symposium on Security and Privacy. IEEE, 2009. (Year: 2009).*
(Continued)

*Primary Examiner* — Shawnchoy Rahman
(74) *Attorney, Agent, or Firm* — Hanley, Flight & Zimmerman, LLC

(57) ABSTRACT

Methods apparatus, systems, and articles of manufacture for IoT and PoS anti-malware are disclosed. An example method includes detecting a combination of function calls. Whether the combination of function calls is a forbidden combination of function calls for the device is detected based on a limited intended functionality of the device. The forbidden combination of function calls includes a first function call and a second function call. The first function call is allowed in isolation from the second function call. The second function call is allowed in isolation from the first function call. In response to determining that the combination of function calls is forbidden for the device, a responsive action is performed.

20 Claims, 6 Drawing Sheets

Related U.S. Application Data continuation of application No. 15/087,110, filed on Mar. 31, 2016, now Pat. No. 10,079,845.

(56) References Cited

U.S. PATENT DOCUMENTS

| | | | |
|---|---|---|---|
| 8,775,802 | B1 | 7/2014 | Kargman et al. |
| 8,924,922 | B2 | 12/2014 | Biswas et al. |
| 10,079,845 | B2 | 9/2018 | Tiernan et al. |
| 10,432,655 | B2 | 10/2019 | Tiernan et al. |
| 2004/0255163 | A1 | 12/2004 | Swimmer et al. |
| 2007/0281753 | A1 | 12/2007 | Dobler et al. |
| 2010/0031361 | A1 | 2/2010 | Shukla |
| 2011/0239306 | A1 | 9/2011 | Avni et al. |
| 2011/0296192 | A1 | 12/2011 | Hayashi et al. |
| 2013/0205389 | A1* | 8/2013 | Grocutt .............. G06F 21/52 726/22 |
| 2014/0013429 | A1 | 1/2014 | Lu |
| 2014/0020092 | A1 | 1/2014 | Davidov |
| 2015/0288720 | A1 | 10/2015 | Touboul |
| 2016/0306964 | A1 | 10/2016 | Austin et al. |
| 2017/0214701 | A1 | 7/2017 | Hasan |

OTHER PUBLICATIONS

Stamm, Sid, Brandon Sterne, and Gervase Markham. "Reining in the web with content security policy." Proceedings of the 19th international conference on World wide web. 2010. (Year: 2010).*

United States Patent and Trademark Office, "Non-Final Office Action," issued in connection with U.S. Appl. No. 15/087,110, dated Nov. 29, 2017, 13 pages.

United States Patent and Trademark Office, "Notice of Allowance," issued in connection with U.S. Appl. No. 15/087,110, dated May 17, 2018, 17 pages.

Patent Cooperation Treaty, "Search Report," issued in connection to International Patent Application No. PCT/US2017/022323, dated Jun. 23, 2017, 3 pages.

Patent Cooperation Treaty, "Written Opinion," issued in connection to International Patent Application No. PCT/US2017/022323, dated Jun. 23, 2017, 6 pages.

United States Patent and Trademark Office, "Non-Final Office Action," issued in connection with U.S. Appl. No. 16/116,452, dated Dec. 14, 2018, 10 pages.

United States Patent and Trademark Office, "Notice of Allowance," issued in connection with U.S. Appl. No. 16/116,452, dated May 22, 2019, 9 pages.

* cited by examiner

IOT AND POS ANTI-MALWARE STRATEGY

RELATED APPLICATION

This patent arises from a continuation of U.S. patent application Ser. No. 16/116,452, (now U.S. Pat. No. 10,432, 655) which was filed on Aug. 29, 2018 and was entitled "IOT AND POS ANTI-MALWARE STRATEGY", which is a continuation of U.S. patent application Ser. No. 15/087, 110, (now U.S. Pat. No. 10,079,845) which was filed on Mar. 31, 2016 and was entitled "IOT AND POS ANTI-MALWARE STRATEGY". U.S. patent application Ser. Nos. 16/116,452 and 15/087,110 are hereby incorporated herein by reference in their entireties. Priority to U.S. patent application Ser. Nos. 16/116,452 and 15/087,110 is hereby claimed.

TECHNICAL FIELD

Embodiments described herein generally relate to device security, and more specifically to internet of things and point of sale anti-malware strategy.

BACKGROUND

Today's technology allows for many devices to have limited functionality and be communicably coupled and work together in a larger network. The Internet of Things (IoT) provides a network of numerous types of devices that may connect with more typical computer devices. These devices may be embedded with, for example, electronics, sensors, and network connectivity. Further, IoT devices may include sensors, displays, Point of Sale (PoS) terminals, kiosk devices, and other non-general compute systems.

Because IoT devices often have limited functionality, IoT devices may have small amounts of memory, storage, and other resources. However, IoT devices are still vulnerable to malware, tampering, and other security issues. Further, because of the limited resources, it is often unreasonable to run a full anti-malware system.

DETAILED DESCRIPTION

Figure 1:
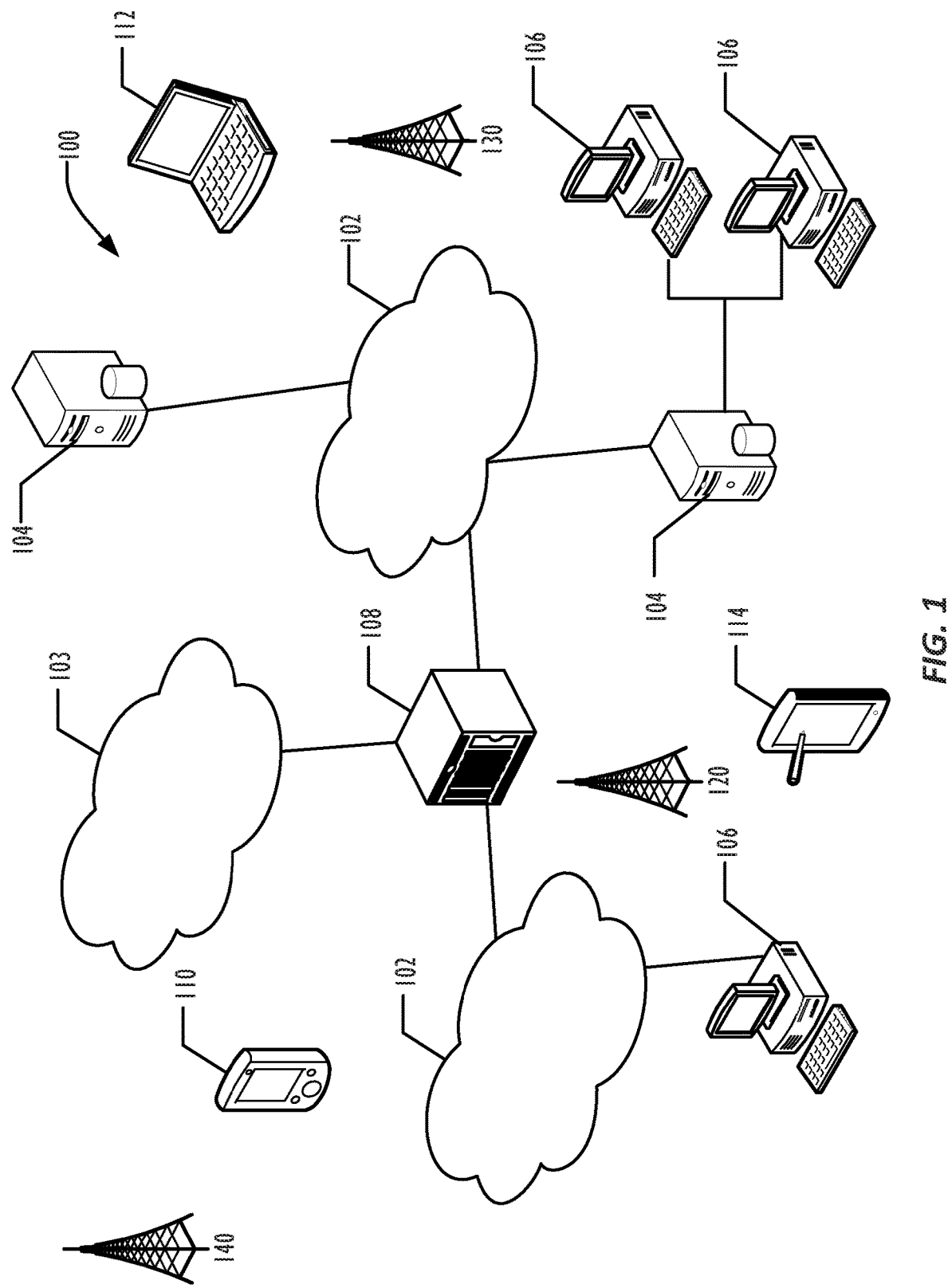
FIG. 1 is a diagram illustrating a network of programmable devices according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "medium" refers to a single physical medium or a plurality of media that together store what is described as being stored on the medium.

As used herein, the term "network device" can refer to any computer system that is capable of communicating with another computer system across any type of network.

As used herein, the term "IoT device" may refer to a computing device that has a particular intended functionality.

In one or more embodiments, a technique is provided for providing an anti-malware strategy which may be useful in PoS and IoT devices. In one or more embodiments, the limited intended functionality is utilized to provide an anti-malware strategy without using computationally expensive operations or large amounts of data storage. Certain operations within the operating system of an IoT device may be considered forbidden functions. For example, in an IoT device running embedded Windows, the function getprocmemory may not be considered a legitimate function. In one or more embodiments, function calls that are considered forbidden may be hooked in order to prevent the function call from execution. Function calls may be forbidden based on an intended functionality of the device on which the function call is made. In addition, a function call may be innocuous for a particular device, but particular parameters for the function call may be forbidden. As another example, an otherwise innocuous function call may be considered forbidden if it is part of a forbidden combination of function calls. Moreover, an innocuous combination of function calls may be associated with forbidden parameters. Further, in one or more embodiments, other actions may be taken. For example, a notification may be generated and sent to a user device, data regarding the forbidden function call may be sent to a remote server for analysis, or the device may be disabled. Further, in one or more embodiments, the forbidden function list may be occasionally or periodically updated, and may be specific to the intended functionality of the monitored IoT device.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.). Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
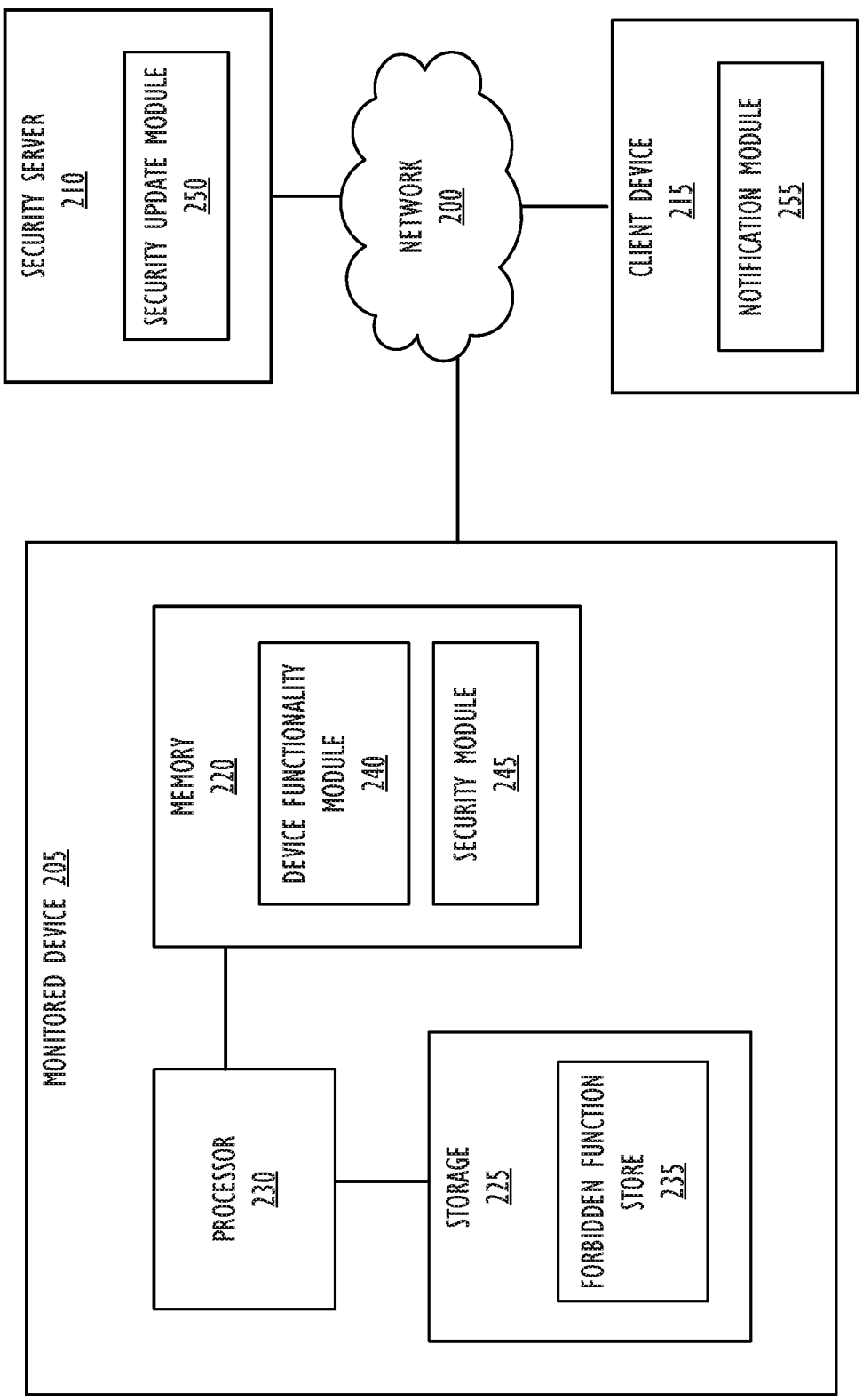
FIG. 2 is a diagram illustrating a system for IoT and PoS device anti-malware strategy according to one or more embodiments.

FIG. 2 is a diagram illustrating a system for IoT and PoS device anti-malware strategy according to one or more embodiments. FIG. 2 includes several devices connected across network 200. As depicted, network 200 may connect such computer systems as a monitored device 205, client device 215, and security server 210. In one or more embodiments, monitored device 205 may be an IoT device and have a particular intended functionality. In one or more embodiments, the functionality of the various components may be differently distributed than the particular depiction of FIG. 2. Network 200 may be any type of computer network, such as a LAN or a corporate network, including a plurality of interconnected networks. For example, Network 200 may include a subset of the devices included in larger network 102 or 103.

In one or more embodiments, monitored device 205 may be a computer device with numerous components, such as the depicted processor 230, memory 220, and storage 225. Further, in one or more embodiments, the monitored device 205, as depicted, may be a more constricted device, and have only bare bones components, such as a processor 230 and memory 220. Similarly, security server 210 and client device 215 may either or both also have a processor, memory, and/or storage.

The monitored device 205, or client device 215, may also include other components, such as a display, or a sensor hub. The display may be any display device for a client device. For example, the display may be a cathode ray tube (CRT) display, a light-emitting diode (LED) display, an electroluminescent (ELD) display, electronic paper, plasma display panel (PDP), liquid crystal display (LCD), and the like. In addition, monitored device 205 and client device 215 may also include other user-interactive devices, such as speakers. In one or more embodiments, the client device 215 may utilize the various I/O devices to present notifications to a user of the client device 215. In one or more embodiments, the notifications may be related to the monitored device 205 or the security server 210.

In one or more embodiments, memory 220 of monitored device 205 includes one or more modules. For example, monitored device 205 may include a device functionality module 240. That is, in one or more embodiments, the monitored device 205 may be an IoT device that has a particular intended functionality. Memory 220 may also include a security module. In one or more embodiments, security module 245 may include computer code to monitor function calls in the monitored device 205. In one or more embodiments, the security module 245 may include computer code which monitors functionality of the monitored device 205 to detect forbidden functions. In one or more embodiments, the security module 245 may include a system driver which hooks the native application programming interface (API) call when it detects abnormal activity. Abnormal activity may be forbidden function call or other activity based on the intended functionality of the monitored device 205.

In one or more embodiments, monitored device 205 may keep a record of forbidden functions. The forbidden functions may be in the form of a list or other data structure and may be stored, for example, in forbidden function store 235 storage 225. In one or more embodiments, the forbidden functions may alternatively be stored in memory 220, or in another location across network 200. Forbidden function store 235 may store details regarding how a particular function call may be determined to be forbidden. As an example, a forbidden function call may be identified by name alone. That is, forbidden function store 235 may keep a blacklist of function calls for the particular device. Further, forbidden function store 235 may track other details that would render an otherwise innocuous function call to be forbidden. As an example, particular parameters to an otherwise allowed function call may render the function call forbidden. As another example, a function call as part of a particular combination of function calls may be forbidden. In one or more embodiments, a log may be kept of all called functions in order to determine a context of a particular function call within a combination of function calls. Further, any combination may also apply. That is, a particular combination of function calls may be considered innocuous but for a forbidden parameter or set of parameters for the combination of function calls. In one or more embodiments, the determination of what is forbidden may be device specific, or may be determined based on an intended functionality of the device.

Further, in one or more embodiments, another device, such as a security server 210 may occasionally or periodically provide updates to the forbidden function store 235. For example, security server may include a security update module 250 that provides updates to the monitored device 205 regarding forbidden functions for the monitored device 205. In one or more embodiments, the updates to the forbidden function store 235 may be based on a characteristic or a particular function of monitored device 205.

In one or more embodiments, monitored device 205 may provide a notification when a forbidden function call is detected. Monitored device 205 may transmit a notification to another user device, such as client device 215 that a forbidden function call has been detected. In one or more embodiments, client device 215 may present the notification, for example, through notification module 255. In one or more embodiments, monitored device 205 may additionally or alternatively provide a notification to a remote server, such as security server 210, for further analysis of the function call, or combination of function calls, or other information associated therewith. In one or more embodiments, the process ID may be included in the notification, or may be used to obtain further details regarding a function call. For example, the process ID may be used to acquire a process name or a path. The notification may additionally, or alternatively, include the information obtained using the process ID.

Figure 3:
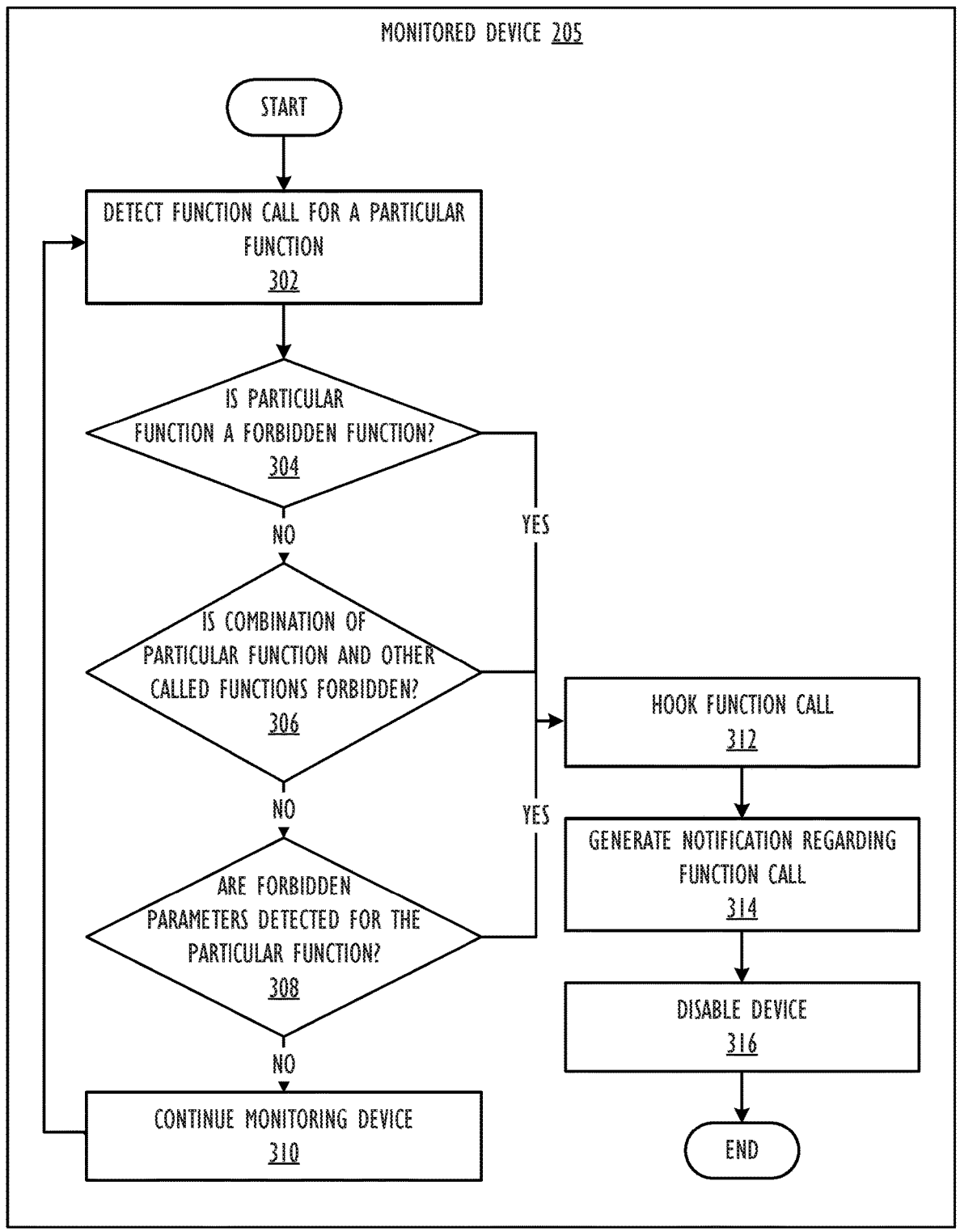
FIG. 3 is a flow diagram illustrating a technique for providing an anti-malware strategy, according to one or more embodiments.

FIG. 3 is a flow diagram illustrating a technique for providing an anti-malware strategy, according to one or more embodiments. The method begins at 302, and the monitored device 205 detects a function call for a particular function. In one or more embodiments, security module 245 in memory 220 may detect the function call for a particular function. The technique continues at 304 and a determination is made regarding whether the function is a forbidden function. In one or more embodiments, the function call is compared against a forbidden function list, such as that stored in forbidden function store 235. If, at 304 it is determined that the particular function is not a forbidden function, then the technique continues at 306 and the security module 245 determines whether the function call is part of a forbidden combination of function calls. For example, the particular function call may be considered innocuous for the monitored device 205, but not in combination with certain other function calls. If it is determined that the particular function is not part of a forbidden combination of function calls, then the technique continues at 308 and a determination is made regarding whether any parameters or combination of parameters are forbidden for the detected function call or combination of function calls. If a determination is made that the parameters are not forbidden, then the technique continues at 310, and the security module 245 continues monitoring the device until another function call is detected at 302.

Returning to decision blocks 304, 306, and 308, if it is determined that a forbidden function call is detected, then the technique continues at block 312. Again, a particular function call may be forbidden in several situations, such as the function call being on a forbidden list or being part of a forbidden combination of function calls, or being associated with parameters that are forbidden for that particular function call, or combination of function calls.

At 312, the monitored device 205 hooks the function call associated with the forbidden function. That is, in one or more embodiments, the security module 245 prevents the function call for the forbidden function from executing. The technique continues at 314 and the monitored device may generate a notification regarding the function call. In one or more embodiments, the monitored device 205 may deliver the notification to a user via the security server 210 or the client device 215 such as through notification module 255. As described above, the notification may allow a security server to do further analysis on the forbidden function. The notification may also allow the user or other party to take additional action for the monitored device 205. The technique may continue at 312, and the monitored device 205 may be disabled. That is, in one or more embodiments, in responses to detecting a forbidden function in monitored device 205, the intended functionality of monitored device 205 may be disabled. In one or more embodiments, disabling the device may include one or more or blocking the detected calls from executing, isolating and terminating the offending binary, notifying a user of the offending activity, and submitting the activity for offsite analysis. For example, a notification including information about the function call may be generated by the monitored device and transmitted to a remote server for analysis.

Figure 4:
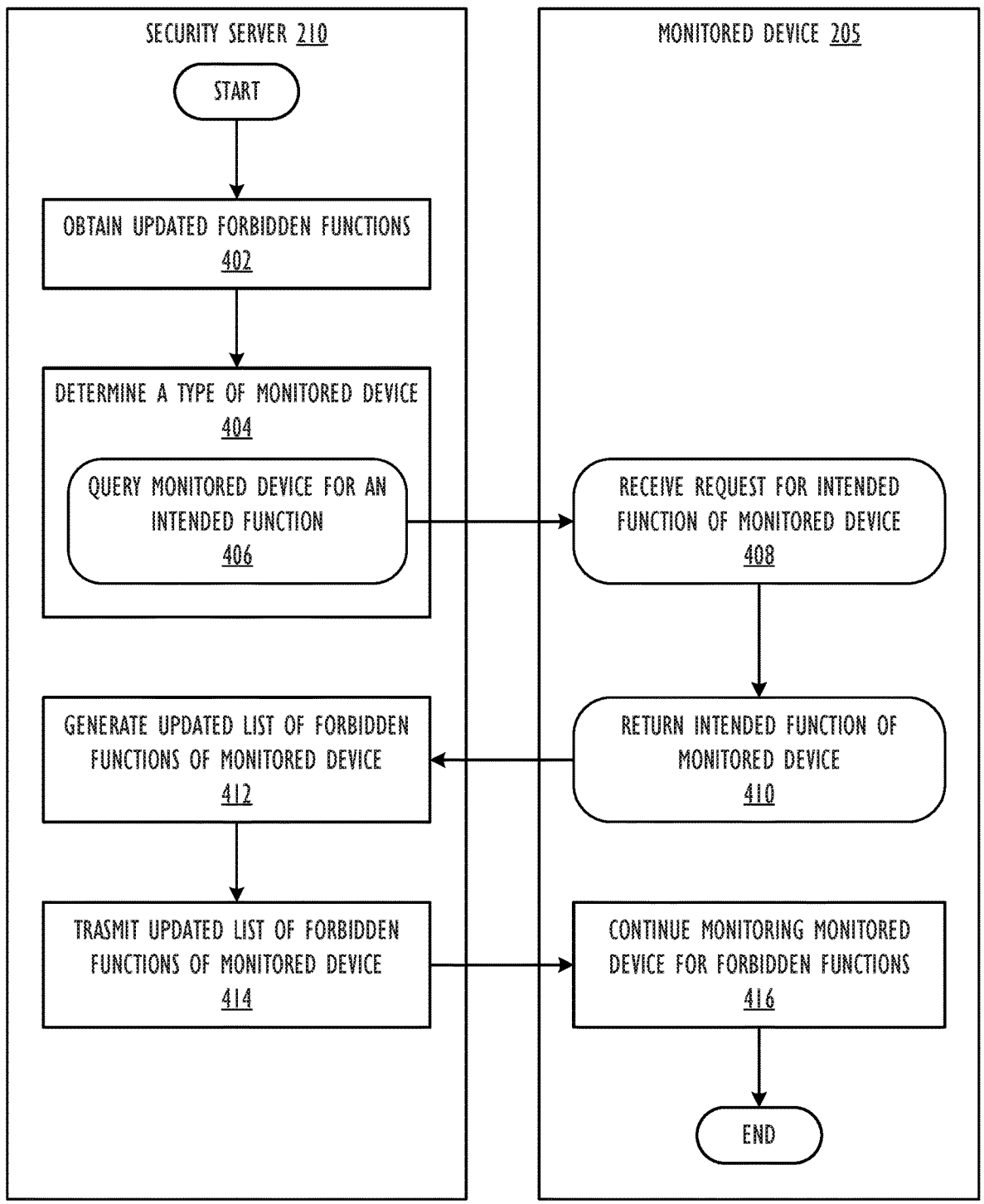
FIG. 4 is a flow diagram illustrating a technique for updating an anti-malware strategy, according to one or more embodiments.

FIG. 4 is a flow diagram illustrating a technique for updating an anti-malware strategy, according to one or more embodiments. That is, in one or more embodiments, it may be occasionally beneficial or necessary to update the list of forbidden functions. The flow diagram being at 402 and security server 210 obtains updated forbidden functions. In one or more embodiments, the updated forbidden function may be received at the security server 210 by an administrator, or may be determined after analysis of previously received notification from one or more monitored devices.

The technique continues at 404 and a type of monitored device is determined. In one or more embodiments, the list or group of forbidden functions may be device or function specific. That is, if the intended functionality of a particular device such as an IoT device is known, then it can be determined function that should not be allowable on the device. Optionally at 406, security server 210 may determine a particular device type of the monitored device 205 by querying the monitored device for an intended function.

In one or more embodiments, after the security server 210 queries the monitored device 205 for an intended function, then the monitored device 205 receives the request for the intended function for the monitored device at 408. Then at 410, the monitored device optionally returns the intended functionality of the monitored device 205 to the security server 210.

At 412 the security server 210 generates an updated list of forbidden functions of the monitored device 205. In one or more embodiments, the updated list is device specific, or function specific. That is, if an IoT device has a specific intended functionality, the list of forbidden functions may include functions outside the intended functionality.

At 414, the security server 414 transmits the updated list to the monitored device 205. In one or more embodiments, the updated list may be stored and accessed remotely from the monitored device 205. However, in one or more embodiments, the updated list of forbidden functions of the monitored device may be stored on the monitored device. For example, the forbidden list of functions of the monitored device may be stored locally, such as in forbidden function store 235 in monitored device 205. Then at 416, security module 245 continues monitoring monitored device 205 based on the updated forbidden functions.

Figure 5:
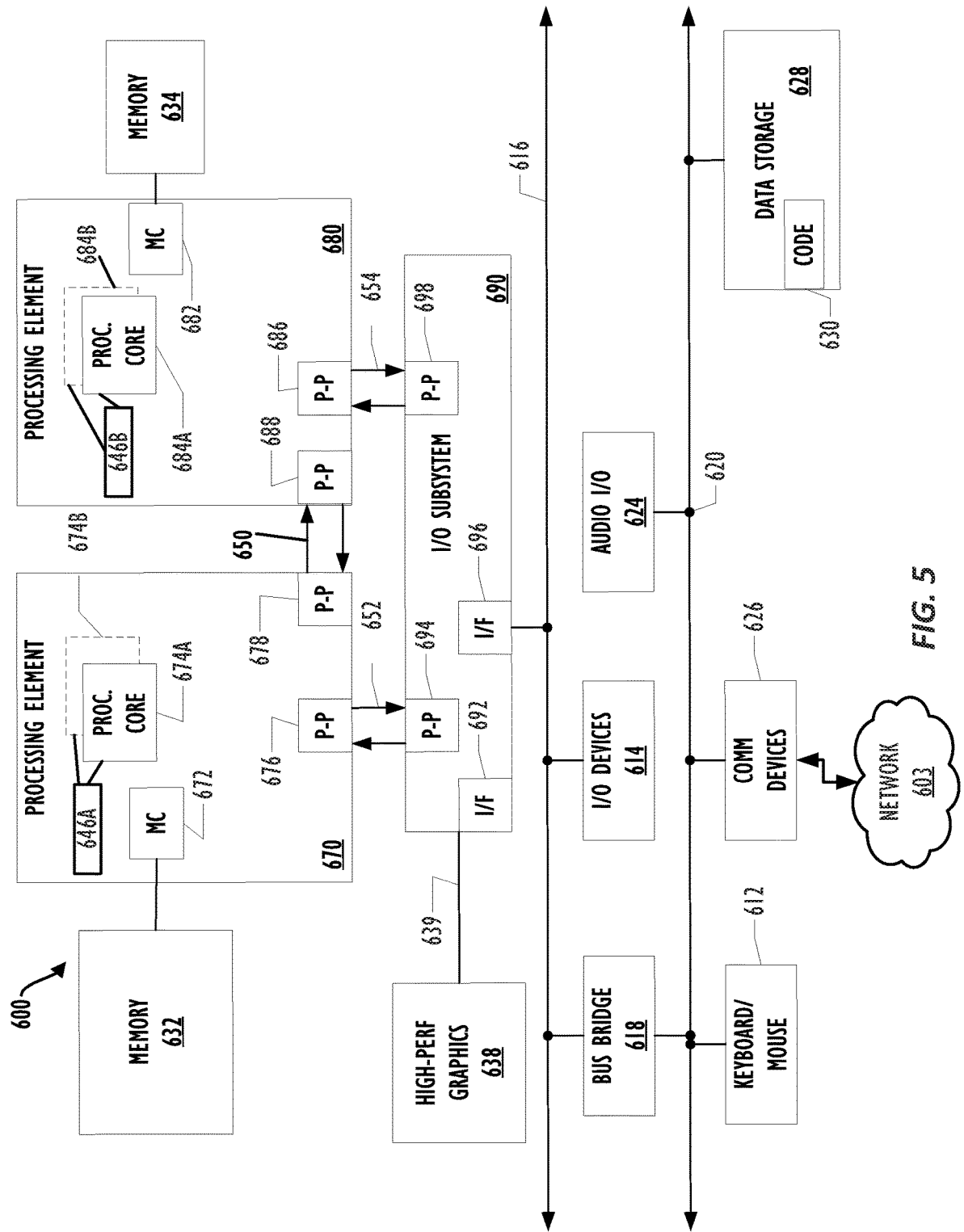
FIG. 5 is a diagram illustrating a computing device for use with techniques described herein according to one embodiment.
Figure 6:
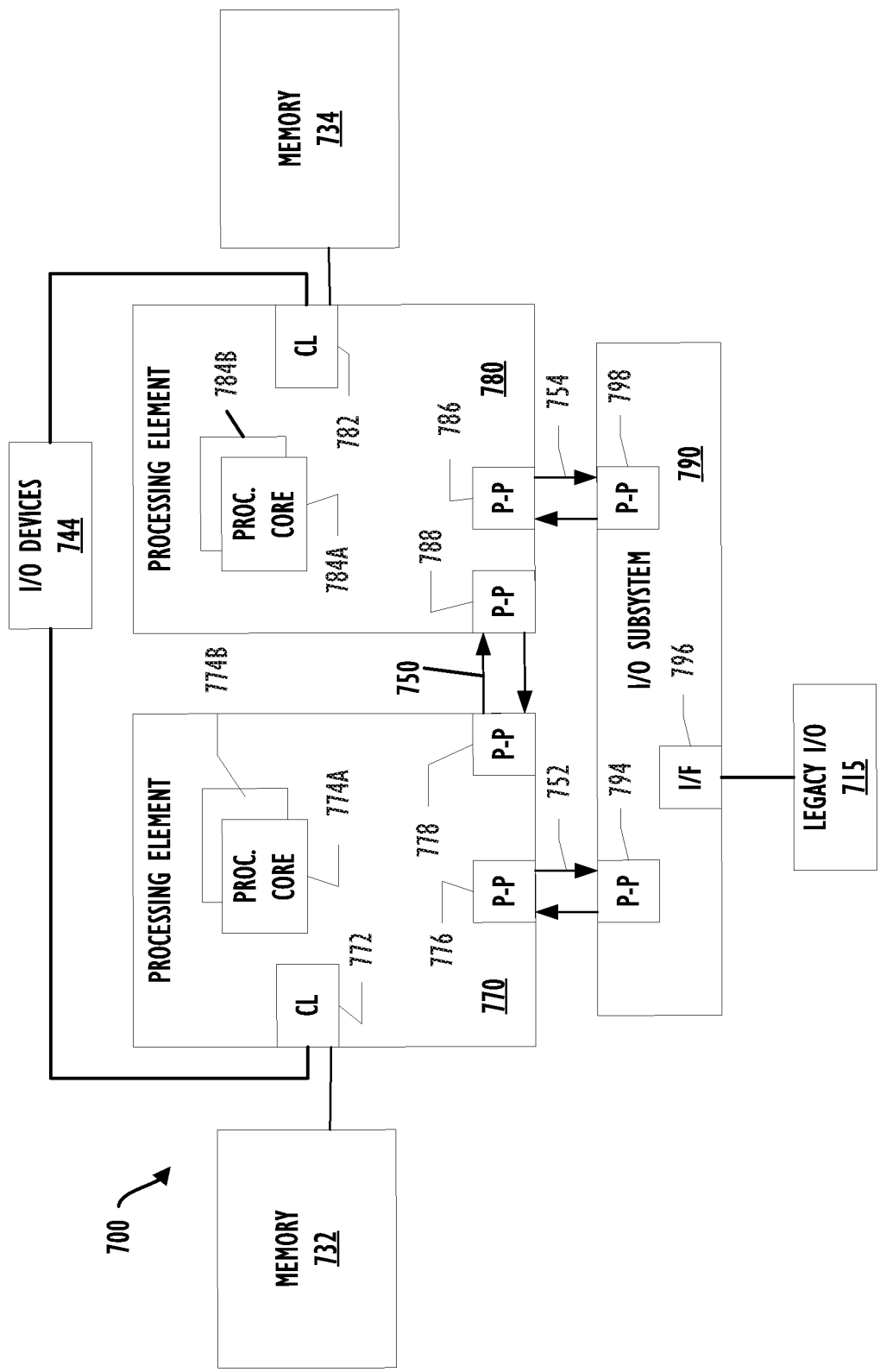
FIG. 6 is a block diagram illustrating a computing device for use with techniques described herein according to another embodiment.

Referring now to FIG. 5, a block diagram illustrates a programmable device 600 that may be used within a computer device, such as monitored device 205, client device 215 or security server 210 in accordance with one or more embodiments. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 5, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 5, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 5, a system may implement a multi-drop bus or another such communication topology. Although links 616 and 620 are illustrated as busses in FIG. 6, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770, 780 may include integrated memory and I/O control logic ("CL") 772 and 782, respectively. In some embodiments, the 772, 782 may include memory control logic (MC) such as that described above in connection with FIG. 5. In addition, CL 772, 782 may also include I/O control logic. FIG. 6 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 6 as processor cores 774A, 774B, 784A, and 784B. As illustrated in FIG. 6, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 5 and 6 are schematic illustrations of embodiments of programmable devices which may be utilized to implement various embodiments discussed herein. Various components of the programmable devices depicted in FIGS. 5 and 6 may be combined in a system-on-a-chip (SoC) architecture.

In one or more embodiment, aspects of the above description may be able to stop unknown malware before it is able to do harm to the infected computer or IoT device. In addition, the disclosure may be able to isolate or remove the offending binary. High value information may be protected from being exfiltrated by an infected device.

As an example, PoS malware may rely on the ability to open a handle to a target process, determine the mapped region of memory the process is using, then call ReadProcMemory in order to access the memory resident data for a process. The malware may attempt to search the data for strings that match the known format for track 1/track 2 data. In one or more embodiments, the forbidden function identified may be a single function call, or a collection of API calls.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: detect, in a device, a function call; determine whether the function call is forbidden for the device; and in response to determining that the function call is forbidden for the device, prevent the function call from executing.

In Example 2 the subject matter of Example 1 optionally includes wherein the instructions that cause the machine to determine whether the function call is forbidden for the device comprises instructions that cause the machine to: determine that the function call is associated with a function that is forbidden for the device.

In Example 3 the subject matter of Example 1 optionally includes wherein the instructions that cause the machine to determine whether the function call is forbidden for the device comprises instructions that cause the machine to: determine that the function call is detected as part of a forbidden combination of function calls for the device.

In Example 4 the subject matter of Example 1 optionally includes wherein the instructions that cause the machine to determine whether the function call is forbidden for the device comprises instructions that cause the machine to: determine that the function call is associated with a forbidden parameter for the device.

In Example 5 the subject matter of any of Examples 1-4 optionally includes further comprising instructions that cause the machine to: generate a notification regarding the function call; and transmit the notification to a user device.

In Example 6 the subject matter of any of Examples 1-4 optionally includes further comprising instructions that cause the machine to: generate a notification regarding the function call; and transmit the notification to a remote server, wherein the notification comprises data regarding the function call for analysis.

In Example 7 the subject matter of any of Examples 1-4 optionally includes wherein the function call comprises one or more API calls.

In Example 8 the subject matter of any of Examples 1-4 optionally includes wherein the device is a point of sale device.

Example 9 is a system for providing device security, comprising: one or more processors; and a memory coupled to the one or more processors and comprising instructions which, when executed by the one or more processors, cause the system to: detect, in a device, a function call; determine whether the function call is forbidden for the device; and in response to determining that the function call is forbidden for the device, prevent the function call from executing.

In Example 10 the subject matter of Example 9 optionally includes wherein the instructions that cause the system to determine whether the function call is forbidden for the device comprises instructions that cause the system to: determine that the function call is associated with a function that is forbidden for the device.

In Example 11 the subject matter of Example 9 optionally includes wherein the instructions that cause the system to determine whether the function call is forbidden for the device comprises instructions that cause the system to: determine that the function call is detected as part of a forbidden combination of function calls for the device.

In Example 12 the subject matter of Example 9 optionally includes wherein the instructions that cause the system to determine whether the function call is forbidden for the device comprises instructions that cause the system to: determine that the function call is associated with a forbidden parameter for the device.

In Example 13 the subject matter of any of Examples 9-12 optionally includes further comprising instructions that cause the system to: generate a notification regarding the function call; and transmit the notification to a user device.

In Example 14 the subject matter of any of Examples 9-12 optionally includes further comprising instructions that cause when executed by the one or more processors, cause the system to: generate a notification regarding the function call; and transmit the notification to a remote server, wherein the notification comprises data regarding the function call for analysis.

In Example 15 the subject matter of any of Examples 9-12 optionally includes further comprising instructions that when executed by the one or more processors cause the system to: receive, from a remote device, an updated list of forbidden function calls; and monitor the device to detect a further forbidden function call using the updated list of forbidden functions.

In Example 16 the subject matter of Example 15 optionally includes wherein the updated list of forbidden functions is specific to an intended functionality of the device.

Example 17 is a method for providing device security, comprising: detecting, in a device, a function call; determining whether the function call is forbidden for the device; and in response to determining that the function call is forbidden for the device, preventing the function call from executing.

In Example 18 the subject matter of Example 17 optionally includes wherein determining whether the function call is forbidden for the device further comprises: determining that the function call is associated with a function that is forbidden for the device.

In Example 19 the subject matter of Example 17 optionally includes wherein determining whether the function call is forbidden for the device further comprises: determining that the function call is detected as part of a forbidden combination of function calls for the device.

In Example 20 the subject matter of Example 17 optionally includes wherein determining whether the function call is forbidden for the device further comprises: determining that the function call is associated with a forbidden parameter for the device.

In Example 21 the subject matter of any of Examples 17-20 optionally includes wherein determining whether the particular function is forbidden for the device comprises: generating a notification regarding the function call; and transmitting the notification to a user device.

In Example 22 the subject matter of any of Examples 17-20 optionally includes further comprising: generating a notification regarding the function call; and transmitting the notification to a remote server, wherein the notification comprises data regarding the function call for analysis.

In Example 23 the subject matter of any of Examples 17-20 optionally includes wherein the function call comprises one or more API calls.

In Example 24 the subject matter of any of Examples 17-20 optionally includes further comprising: receiving, from a remote device, an updated list of forbidden function calls; and monitoring the device to detect a further forbidden function call using the updated list of forbidden functions.

In Example 25 the subject matter of Example 24 optionally includes wherein the updated list of forbidden function calls is specific to an intended functionality of the device.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore should be determined with reference to the appended claims, along with the full scope of equivalents to which such claims are entitled.

What is claimed is:

1. An apparatus for providing security for a device, the apparatus comprising:
    memory; and
    one or more processors to execute machine readable instructions to cause the one or more processors to at least:
        in response to detecting a first function call, identify a second function call in a log of function calls;
        determine whether a combination of the first function call and the second function call is forbidden for execution by the device based on a limited intended functionality of the device, the first function call allowed in isolation from the second function call, the second function call allowed in isolation from the first function call; and
        in response to determining that the combination of the first function call and the second function call is forbidden for the device, perform a responsive action.

2. The apparatus of claim 1, wherein to perform the responsive action, the one or more processors is to at least one of:
    prevent the first function call from executing;
    disable the device; and
    generate a notification.

3. The apparatus of claim 2, wherein the one or more processors is to cause transmission of the notification to a user device.

4. The apparatus of claim 2, wherein the one or more processors is to cause transmission of the notification to a remote server, the notification including data regarding the combination of the first function call and the second function call.

5. The apparatus of claim 1, wherein the one or more processors is to store a record of the first function call in the log of function calls.

6. The apparatus of claim 1, wherein the one or more processors is to determine whether the combination of the first function call and the second function call is forbidden by determining that the combination of the first function call and the second function call is associated with a forbidden parameter for the device, the combination of the first function call and the second function call rendered forbidden based on the forbidden parameter causing the function call to represent functionality outside the limited intended functionality of the device.

7. The apparatus of claim 1, wherein the one or more processors is to:
    access, from a server, an updated list of forbidden function calls; and
    monitor the device to detect a further forbidden function call using the updated list of forbidden function calls.

8. The apparatus of claim 7, wherein the updated list of forbidden function calls is specific to an intended functionality of the device.

9. The apparatus of claim 1, wherein the device is a point of sale device.

10. At least one machine readable storage disk or storage device comprising instructions that, when executed, cause at least one processor to at least:
    in response to detecting a first function call, identify a second function call in a log of function calls;
    determine whether a combination of the first function call and the second function call is a forbidden combination of function calls based on a limited intended functionality of the device, the first function call allowed in isolation from the second function call, the second function call allowed in isolation from the first function call; and
    in response to determining that the combination of the first function call and the second function call is forbidden, perform a responsive action.

11. The at least one machine readable storage disk or storage device of claim 10, wherein the responsive action includes at least one of:
    preventing execution of the first function call from executing;
    disabling the device; and
    generating a notification.

12. The at least one machine readable storage disk or storage device of claim 11, wherein the instructions, when executed, cause the device to at least cause transmission of the notification to a user device.

13. The at least one machine readable storage disk or storage device of claim 11, wherein the instructions, when executed, cause the device to at least cause transmission of the notification to a remote server, the notification including data regarding the combination of the first function call and the second function call for analysis.

14. The at least one machine readable storage disk or storage device of claim 10, wherein the instructions, when executed, cause the device to store a record of the first function call in the log of function calls.

15. The at least one machine readable storage disk or storage device of claim 10, wherein the instructions, when executed, cause the device to at least determine whether the combination of the first function call and the second function call is forbidden by determining that the combination of the first function call and the second function call is associated with a forbidden parameter for the device, the forbidden parameter to cause the combination of function calls to represent functionality outside the limited intended functionality of the device.

16. The at least one machine readable storage disk or storage device of claim 10, wherein the combination of the first function call and the second function call includes one or more API calls.

17. A method to provide security in a device, the method comprising:
   detecting a first function call;
   in response to detecting a first function call, identifying, by executing an instruction with a processor, a second function call in a log of function calls;
   determining, by executing an instruction with the processor, whether the combination of the first function call and the second function call is forbidden based on a limited intended functionality of the device, the first function call allowed in isolation from the second function call, the second function call allowed in isolation from the first function call; and
   in response to determining that the combination of the first function call and the second function call is forbidden, performing a responsive action.

18. The method of claim 17, wherein the responsive action includes at least one of:
   preventing the first function call from executing;
   disabling the device; and
   generating a notification.

19. The method of claim 18, further including storing a record of the first function call in the log of function calls.

20. The method of claim 18, further including transmitting the notification to a remote server, the notification including data regarding the function call.

\* \* \* \* \*